United States Patent [19]

Pasternicki

[11] Patent Number: 4,675,070

[45] Date of Patent: Jun. 23, 1987

[54] MACHINE FOR PRESSURE TESTING AND BOTTOM CAPPING PLASTIC BOTTLES

[75] Inventor: Michel Pasternicki, St. Arnoult en Yvelines, France

[73] Assignee: Sidel, Le Havre, France

[21] Appl. No.: 813,210

[22] Filed: Dec. 24, 1985

[30] Foreign Application Priority Data

Dec. 28, 1984 [FR] France ................................ 84 20075

[51] Int. Cl.[4] ............................................. B32B 31/00
[52] U.S. Cl. .................................... 156/556; 156/156; 156/287; 264/516; 264/573; 425/387.1; 425/500
[58] Field of Search ............... 156/285, 287, 328, 556, 156/156; 264/516, 572, 573; 425/149, 387.1, 500, 812

[56] References Cited

U.S. PATENT DOCUMENTS 4,300,966 11/1981 Hoffmann ........................ 156/156
4,373,888 2/1983 Yamamoto ....................... 425/149
4,414,055 11/1983 Young .............................. 156/566

Primary Examiner—Jay H. Woo
Assistant Examiner—Timothy W. Heitbrink
Attorney, Agent, or Firm—Sughrue, Mion, Zinn, Macpeak and Seas

[57] ABSTRACT

The necks 10 of round bottomed plastic bottles 11 are fed into peripheral notches 9 of an upper turret plate 6, and stabilizing cups 47 are fed onto support plates 49 of vertically movable centering sockets 45 slidable in a lower turret plate 7 and disposed coaxially below the bottles. Pressurized gas in supplied to the bottles by vertically reciprocable stopper posts 23 to implement monitored seal testing, and while the bottles are stiffened by the gas the cups are adhesively applied from below. The various movements are synchronously controlled by rollers 33, 42 riding on circular cams 35, 44.

6 Claims, 7 Drawing Figures

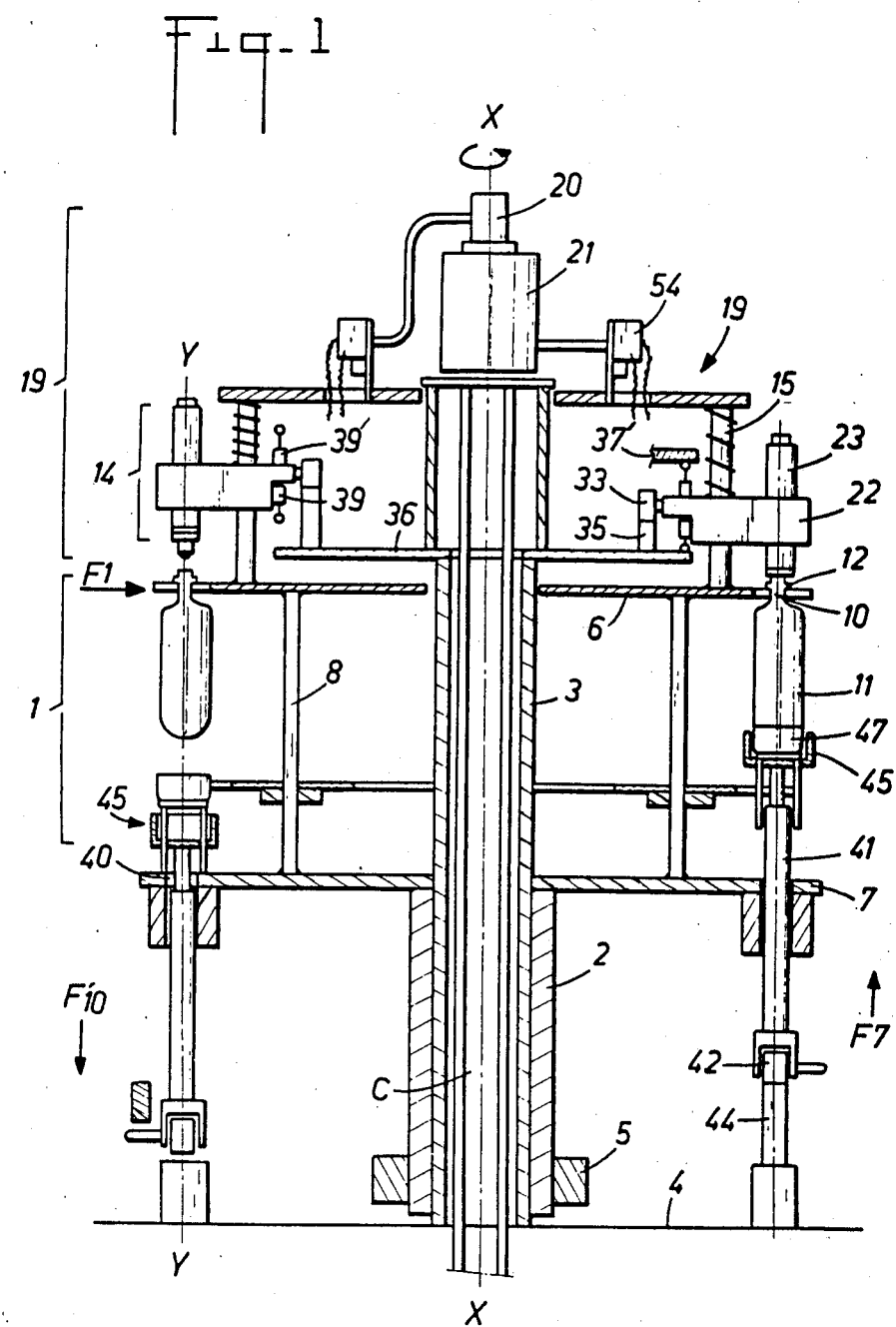

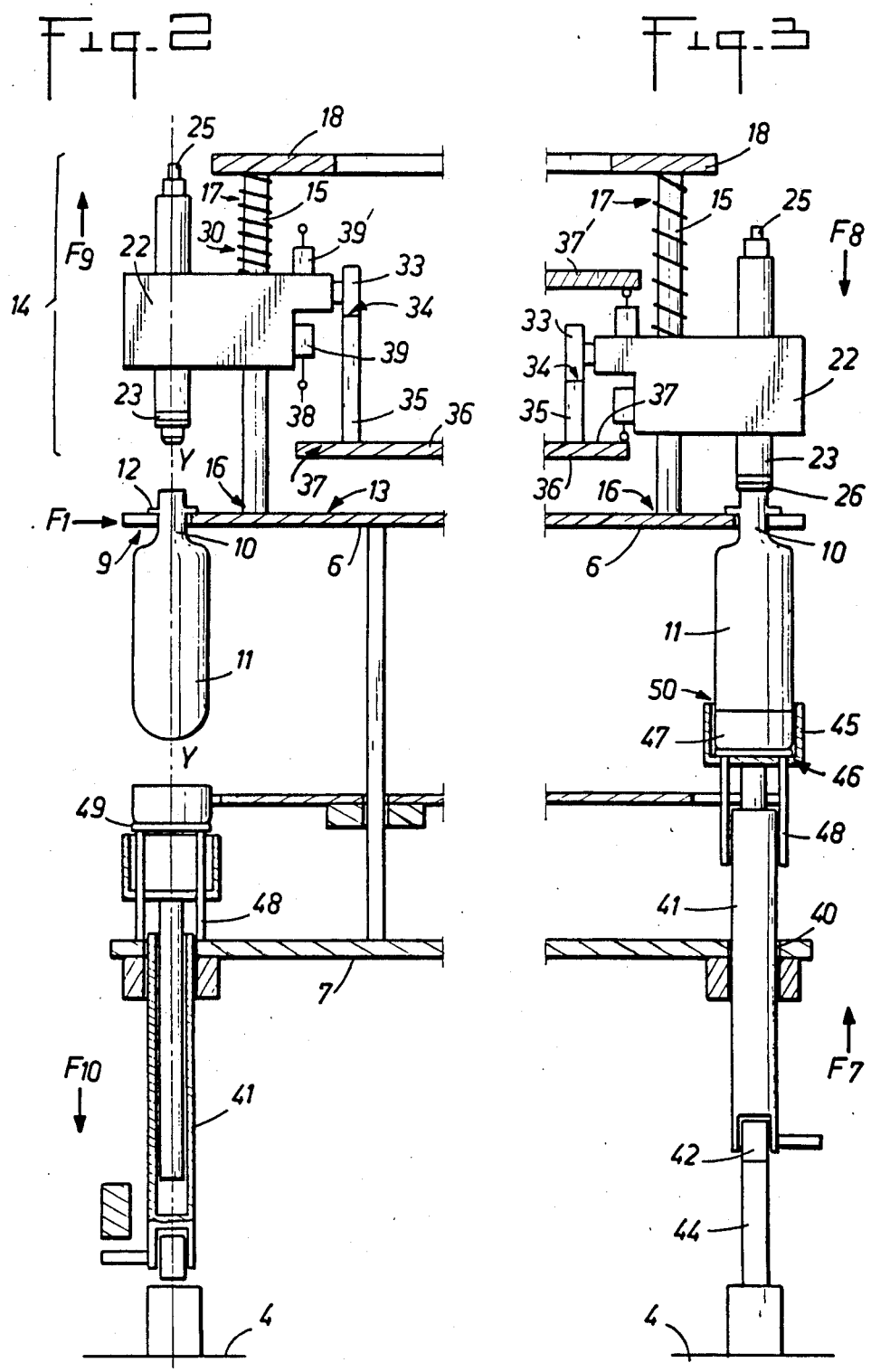

MACHINE FOR PRESSURE TESTING AND BOTTOM CAPPING PLASTIC BOTTLES

BACKGROUND OF THE INVENTION

This invention pertains to a machine for simultaneously placing cup-shaped stabilizing elements on the bottoms of plastic bottles intended to contain carbonated beverages, and pressure testing the bottles.

For reasons of tolerance to the internal pressures to which they are subject, such bottles usually have an approximately hemispheric bottom which is formed when the bottle is blow molded. The configuration of such a bottom does not allow the bottle to stand vertically unsupported on a planar surface. Moreover, this type of bottom is relatively more vulnerable to shocks than a bottom which is flat or which possesses a circular support collar.

To correct these disadvantages, these bottles are supplemented with mounted external stabilization and reinforcement elements, especially cups internally complementing the external profile of the base of the bottle and joined thereto by insertion and axial compression. On the outside the cup comprises a flat or annular base, of the type which conventional monolithic bottles have. A compound bottle is thus obtained, having both the characteristics required for the packaging of carbonated beverages and the stability advantages of any other bottle having a monolithic structure.

During the insertion of the cup on the hemispheric base of light bottles, it is important that the body of the bottles be stiffened so as not to deform under the effect of the axial pressures to which it is subjected. Without this precaution the bottle body would become deformed and would thus be rejected.

The most generally utilized method to stiffen the body of the bottle during the assembly of the cup with the bottle consists of pressurizing the inside of the bottle through the use of a gas, for example, aseptic air, which is injected through the neck of the bottle. When the assembly is completed the inside of the bottle is vented and the bottle is subsequently moved to an inspection station where it is again pressurized for a seal test. This process presents the inconvenience of requiring that the bottles be separately manipulated, pressurized and monitored for the seal testing operation, which increases the cost of the installations and decreases the production rates for the bottles.

SUMMARY OF THE INVENTION

In accordance with this invention, a machine is designed to perform a seal test on the bottles by internal pressurization utilizing a gas ensuring a stiffening of the body of the bottles, which allows the simultaneous placement of the cups on the bodies by axial insertion. The invention thus allows the conventional seal testing station, which is located downstream from the cup installing machine, to be eliminated. This makes it possible to improve the output rate of the machine which places the stabilization cup on the bottom of the bottles, the simplification of the installations required for the execution of the aforementioned tasks, and thus the reduction of the cost of the equipment in such installations.

BRIEF DESCRIPTION OF THE DRAWINGS

FIG. 1 is a partial schematic elevation of a bottle producing machine according to the invention;

FIG. 2 is an elevation of part of the machine before the pressurization of the bottle and the placement of the cup;

FIG. 3 is an elevation similar to FIG. 2, with the bottle being pressurized and the cup being engaged on the base;

DETAILED DESCRIPTION OF THE PREFERRED EMBODIMENT

Figure 4:
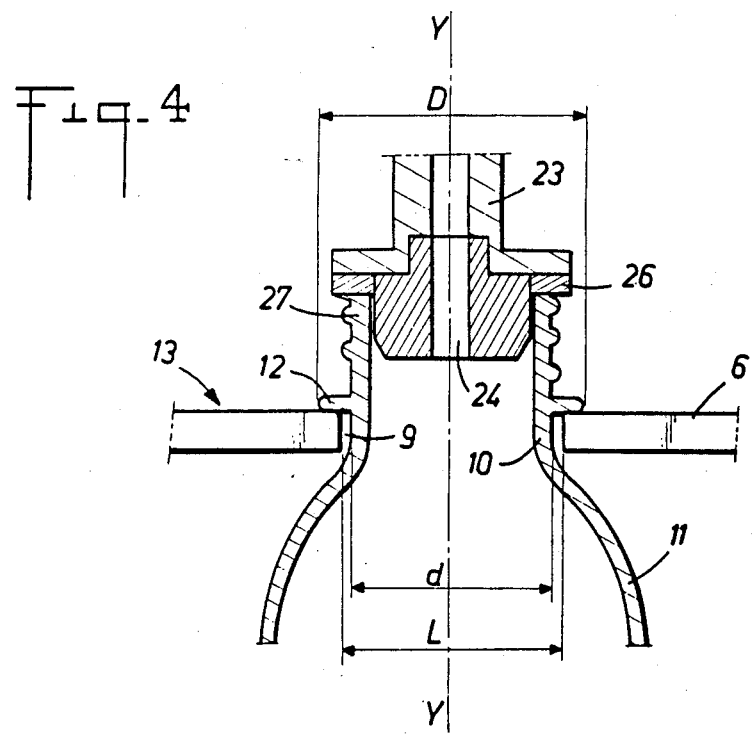
FIG. 4 is an enlarged-scale elevation view of the plug mounted on the bottle.

FIG. 1 shows a bottle producing machine which comprises a turntable 1 having two coupled plates 6, 7 superimposed and on which the insertion of the cups on the base of the bottles as well as the seal tests are performed. The turntable is connected to a hollow shaft 2 having axis XX, and pivots vertically and coaxially around a central shaft 3 having an internal channel C and which is connected to a chassis 4 of the machine. The turntable is rotated by the shaft 2 via a drive gear or pulley 5. The lower turntable plate 7 is attached to the shaft 2 and supports, through crosspieces 8, the upper plate 6 such that the plates 6 and 7 are parallel and concentric, and rotate together around the XX axis.

As shown in FIGS. 1 to 4, the upper plate 6 is circular and has radial notches 9 distributed regularly around its periphery to accommodate the necks 10 of bottles 11. For this purpose (FIG. 4) each notch 9 has an opening of width L slightly greater than the external diameter of the bottle neck 10 but slightly smaller than the external diameter of a skirt 12 provided on the upper part of the bottle neck. Each notch can thus accommodate the neck of a bottle 11, having rotation axis YY, and can keep the bottle suspended with the skirt 12 resting on the upper surface 13 of the upper plate 6. Each notch 9 is associated with a pneumatic fluid feed device 14 for blocking and temporarily pressurizing a suspended bottle 11.

Each pneumatic device 14 (FIGS. 2 and 3) includes a slide rod 15 rigidly and perpendicularly fastened at one of its ends 16 to the upper plate 6, near the base of a notch 9 and between the latter and the XX axis. The other end 17 of each rod 15 is similarly attached to a housing plate 18 of a turret 19 (FIGS. 1, 2 and 3) supporting, in its center, a rotary fitting 20 for monitoring the pneumatic devices 14 and a rotary collector 21 for receiving electrical signals from the devices.

Each rod 15 slidably mounts a block 22 serving as a guide for a sealing and pressurizing post 23 having an internal channel 24 (FIG. 4), with the rotation axis of the post 23 extending the YY axis of a bottle 11 suspended in a notch 9. The posts 23 are arranged concentrically around the XX axis, in the same manner as the notches 9 of the upper plate 6, with their own axes coinciding with the centers of the notches. The upper end of each post 23 has a connection 25 to feed its internal channel 24 with aseptic compressed air, while its lower end is fitted with a flexible stopper 26 for establishing a seal with the mouth 27 of a bottle when the block 22 is lowered. The stopper 26 can be truncated and supported by its external oblique generating lines against the sharp internal angle of the cylindrical mouth 27 of a bottle, or it can be cylindrical (as shown) with a flange portion pressing against the top of the bottle mouth.

The block 22 has a rear extension on which a roller 33 is mounted, cooperating with the contoured upper edge 34 of a circular cam 35 attached to a plate 36 connected to the upper end of the central shaft 3 (FIGS. 1, 2, 3). Each block 22 is pushed in the downward direction along with its roller 33 on the cam 35, by a helical spring 30 which is mounted around the rod 15 and which presses against the housing plate 18. The rollers 33 raise slightly from the cam 35 when the bottles are sealed.

Figure 7:
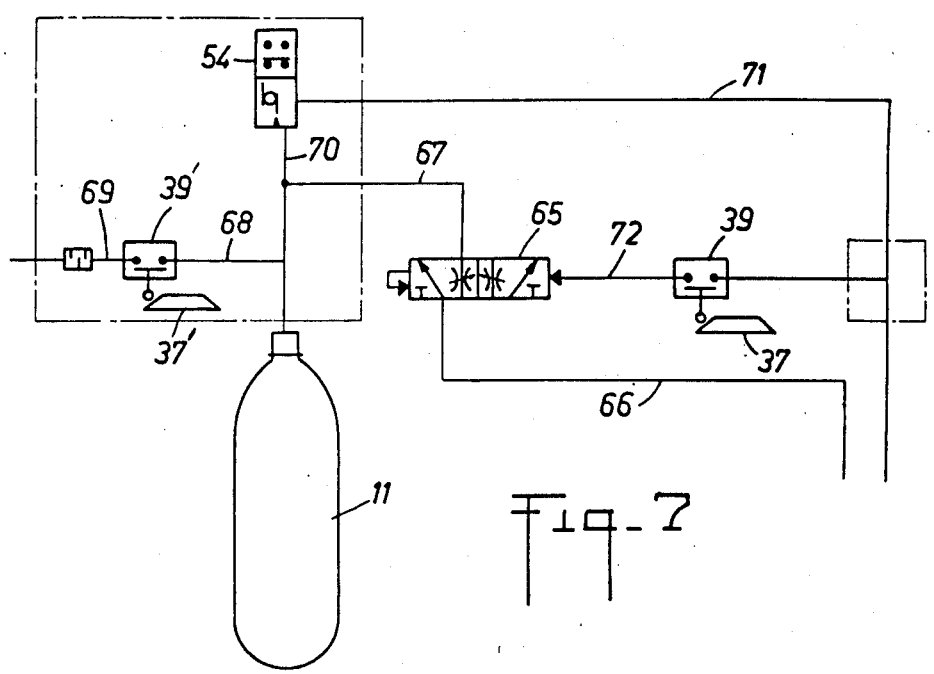
FIG. 7 is a schematic view of the pneumatic pressurization circuit of a bottle for the seal test.

A control boss or flange 37 is provided on the plate 36, which activates a lever 38 for a valve 39 attached to the lower part of each block 22 and which controls a three-line distributor 65 (FIG. 7) connected on one side to a pressurized aseptic gas conduit 66 and on the other side to the internal channel 24 of the post 23 by a conduit 67. A conduit 68 branches from the conduit 67 to a vent valve 39' leading to the atmosphere through a conduit 69. The vent valves 39' are mounted on the upper parts of the blocks 22, and their control rods are activated by a boss 37' which is connected to the fixed plate 36.

The fitting 20 and the collector 21 mounted on the housing plate 18 connect pressure switches 54 attached to the plate 18 with feed circuits. Each pressure switch 54 (FIG. 7) is connected by a conduit 70 to conduit 67 leading to the bottle 11, and by a conduit 71 to a pressurized gas source which also feeds the valve 39. The purpose of the pressure switches 54 is to detect any drop in pressure in a bottle during its stiffening by pressurization, i.e., during the period in which the cup 47 is inserted on a bottle bottom.

The distributor 65 controlled by the valve 39 ensures the filling of the bottle with gas, and, when the pressure for the seal test is reached, the pressure switch 54 activates the distributor 65 to cut off the gas admission and to isolate the bottle, keeping it under pressure for as long as possible for leak detection. When the boss 37' subsequently contacts the valve 39', the gas in the bottle is vented.

In case the bottle's seal is imperfect, the pressure switch 54 sends information to an automatic device which controls the machine to reject the bottle. The reject information translates into an electric signal which excites a control jack 55 (FIG. 5) allowing the defective bottle to be removed (broken lines) from the good bottles (solid lines).

The "good bottle" train comprises a circular turret 58 (FIG. 5) having peripheral notches 59 cooperating tangentially with the notches 9 in the plate 6 and turning in the direction of arrow F6.

The lower plate 7, which is connected to the turning central shaft 2, is a circular plate having guide holes 40 on its periphery for accommodating push rods 41 activated along the YY axes by rollers 42 pressing against the edge of a circular cam 44 (FIGS. 1, 2, 3, and 6) arranged concentrically around the XX axis and attached to the chassis 4.

The upper end of each push rod 41 carries a socket 45 for holding a cup 47 for insertion on the bottle bottom. The cup 47 can be attached to the bottle by sizing or any other known means; in this case the cups are coated with adhesive on their inside walls which contact the bottle. The base 46 of each socket 45 receives a support plate 49 for the cups 47, having feet 48 passing through the socket base for abutment against the upper surface of the plate 7. This arrangement allows a relative movement between the support plate 49 and the socket base 46. The length of the feet 48 is calculated so that the support plate approximately reaches the upper edge of the socket 45 when the roller 42 is in its lowest position on the circular cam 44. In this condition the support plate 49 can be potentially freed from any undesirable cup 47 or bottle 11, just before the placement of a new cup 47 in the socket, through the use of an ejector 51 (FIGS. 5 and 6) on the chassis 4. For this purpose the ejector 51 is mounted slightly above the lowest position of the support plate 49, just before the point of arrival and depositing of the new cups 47 inside the sockets 45.

OPERATION

Figure 5:
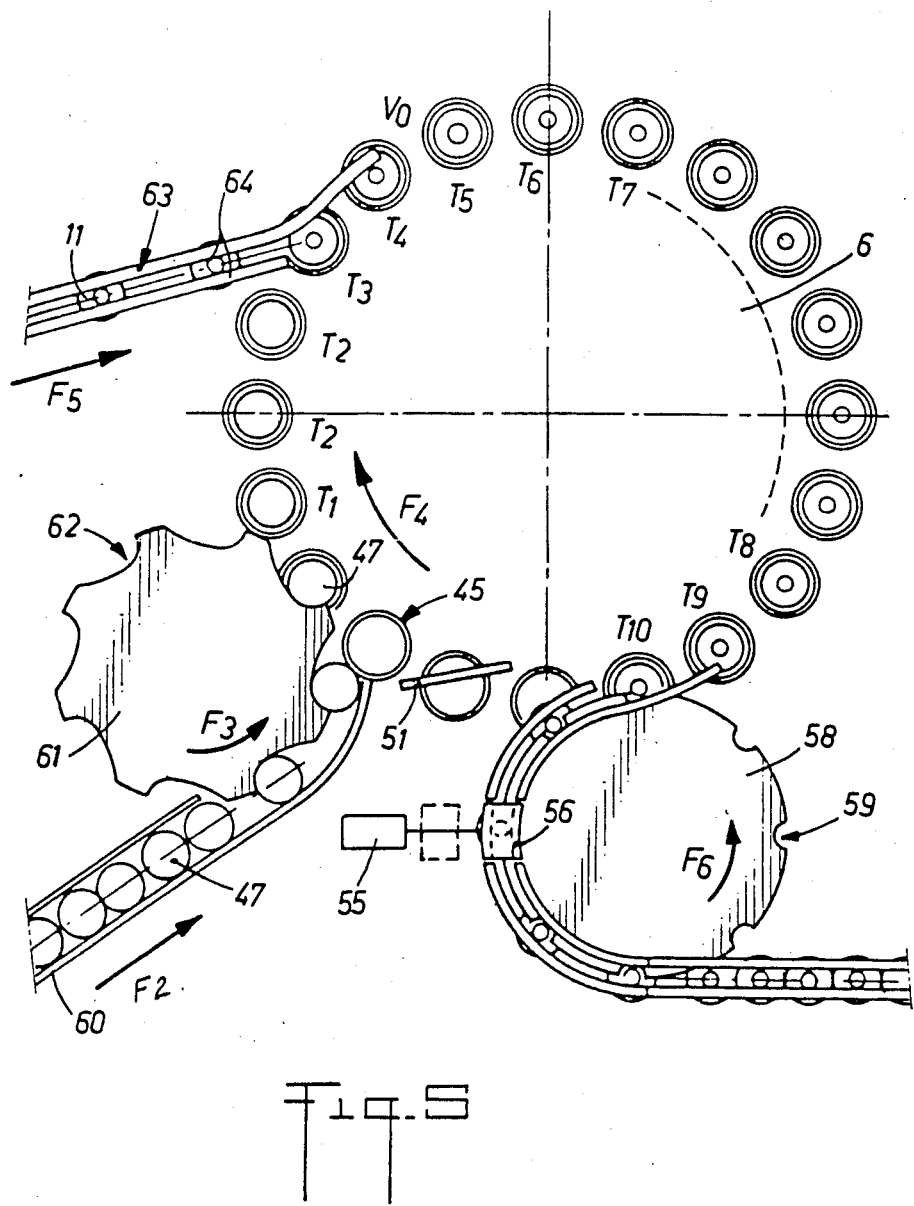
FIG. 5 is a plan view of the transferring means for the bottles and the cups.

As shown in FIG. 5, the cups 47 are transported in upright and against each other on a conveyor 60, moving according to arrow F2 in the direction of a star wheel 61 having notches 62 which turns in the direction of arrow F3 synchronized with the lower plate 7 (FIGS. 1–3), the latter turning in the direction of arrow F4. The profile of the teeth in the star wheel 61 is designed so that the cups 47 separate and are inserted in the notches 62, the space between the notches being compatible with the space between the sockets 45 of the lower turntable plate 7. In the horizontal plane the star wheel 61 slightly overhangs the upper level of the sockets 45, while in the vertical plane, near the point of tangency of the star wheel and the lower plate 7, the position of the notches 62 coincides with that of the sockets 45 such that the succession of cups can fall one by one in each of the sockets of the lower plate.

While the cups follow this path according to F2, F3 and F4, the bottles 11 to be equipped with cups 47 are fed to the upper plate 6 by a conveyor 63 having grips 64 allowing the bottles to be grasped and held vertically by their necks, while they are being transferred towards the upper plate in the direction of arrow F5. In the vertical plane the level of the conveyor 63 is such that the skirts 12 of the bottles are located slightly above the upper plate. The necks 10 of the bottles can thus be engaged laterally in the notches 9 of the upper plate 6 with the skirts 12 resting against the upper surface of the plate.

Figure 6:
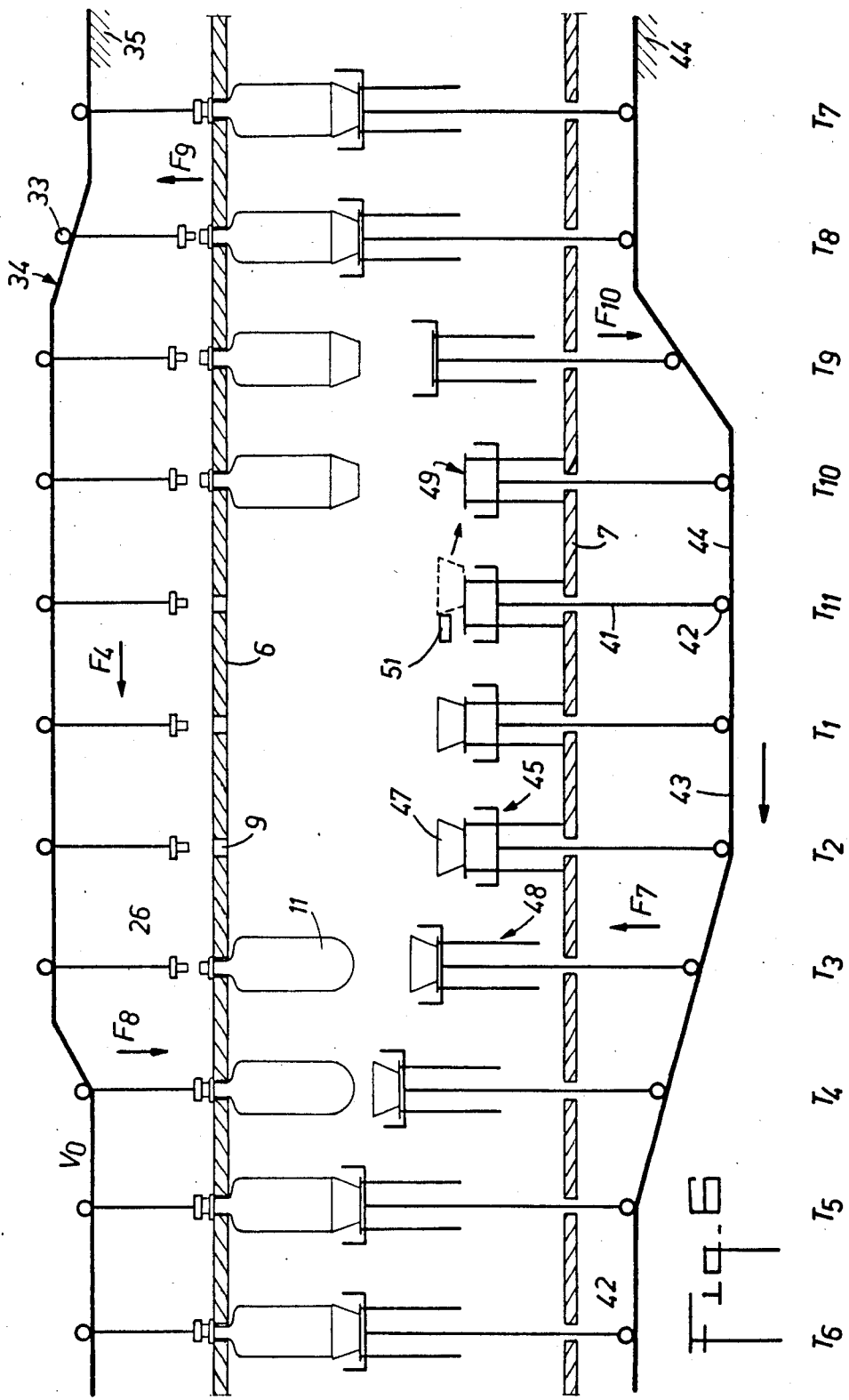
FIG. 6 is a general schematic view showing the different phases of the movements of the bottles and the cups.

The understanding of the insertion cycle of a cup 47 on the bottom of the bottle 11 will be facilitated by referring to FIG. 6, which illustrates the successive phases of this operation as a function of the position of the turntable 1. The profiles of circular cams 35 and 44 are shown in a linear manner for simplicity.

At time T1, the socket 45 is in its lowest position, while the support plate 49 slightly overhangs the upper edge of the socket because the feet 48 press against the upper surface of the lower plate 7. A cup 47 is then placed on the support plate as it passes under the ejector 51 (possible ejection of a cup or bottle remaining from the previous cycle). There is still no bottle in the notch 9 corresponding to the upper plate 6, the roller 33 is in its highest position, and the valves 39 and 39' are closed.

At time T2 the roller 42 enters the ascending ramp 43 of the cam 44, thus causing the socket 45 to move upward with respect to the upper plate 6 in the direction of arrow F7. The feet 48 still rest against the lower plate 7 and the support plate 49 still occupies the same position, thus initiating a progressive insertion of the cup 47 in the socket 45. There is still no bottle in the corresponding notch 9 and the roller 33 is still in its highest position.

At time T3 a bottle 11 is engaged in the corresponding notch 9, but the stopper 26 for the pneumatic device 14 is still in a raised position. The valve 39 is closed and the distributor 65 is in its neutral position. As the roller 42 continues its ascent on the ramp 43, the cup 47 is half-inserted in the socket 45, and the feet 48 leave the lower plate 7.

At time T4 the roller 33 moves downward, pulling its block 22 in the direction of arrow F8, towards its lowest position, and the bottle 11 is closed by the stopper 26. During this phase the spring 30 has progressively expanded to push the stopper post 23 against the bottle.

At time T5 the valve 39, controlled by its lever 38 riding on the boss 37, is opened and, through conduit 72, activates the distributor 65 which connects the pressurized gas conduit 66 with the conduit 67 connected to the inside of the bottle 11. The socket 45 reaches its highest position and the cup 47 is inserted on the bottom of the bottle 11.

At time T6, when the desired pressure inside the bottle is reached, the pressure switch 54 controls the distributor 65 to isolate the bottle from the pressurized air source for the entire seal test period, by interrupting the connection between conduits 66 and 67. The roller 33 is in its lowest position while the roller 42 is in its highest position.

The seal test of the bottle is conducted over time T7, with rollers 33 and 42 moving on the level stages of their respective cams. At the end of the test, if the bottle's seal is defective, a signal is sent to an automatic control which subsequently activates the switch 56 to remove the defective bottle as described above.

At time T8 the inside of the bottle 11 is vented through valve 39', which is activated by boss 37'. The roller 33 on ramp 34 raises the block 22 and stopper 26 in the direction of arrow F9. At time T9 the roller 42 on the descending ramp causes the socket 45 to move downward in the direction of arrow F10, until the bottom of the tested bottle fitted with its cap 47 is completely disengaged from the socket 45 at time T10.

The bottle thereafter leaves the upper plate and enters the exit turret 58. When it reaches the switch 56 it automatically will be expelled if it has failed the seal test. Downstream from the switch 56, the ejector 51 frees the support plate 49 of any cup which has not been removed for reasons of malformation or improper adhesion.

What is claimed is:

1. A machine for completing the manufacture of flexible, blow molded plastic bottles (11), said bottles having hemispherical shaped bottoms, said machine comprising:
   (a) first axially reciprocable means for individually seal testing said bottles by internally pressurizing them with gas at a sufficient pressure level to stiffen bodies of the bottles,
   (b) second axially reciprocable means for individually securing flat based cups (47) to the bottoms of the bottles to render the bottles vertically stable, and
   (c) means for synchronously controlling the axial reciprocation of the first and second means such that the cups are secured to the bottle bottoms during the seal testing of the bottles whereat their bodies are sufficiently stiffened by internal pressurization to resist axial deformation.

2. A machine according to claim 1, wherein the seal testing means comprises a plurality of neck sealing stoppers (26) each having a central channel (24) selectively connectable to a source of pressurized gas and to the atmosphere, and wherein said controlling means comprises a first upper cam (35) for axially reciprocating the stoppers and a second lower cam (44) for axially reciprocating the cup securing means.

3. A machine according to claim 2, wherein the cup securing means comprises:
   (a) a plurality of sockets (45) for individually accommodating a cup (47), each socket being connected to a push rod (41), the push rod being slidably mounted in a hole of a lower turret plate (7) to transfer the cups, and the push rod being connected to a cam follower (42) for contacting said second cam (44) attached to a chassis (4) of the machine, each socket being movable from a first position to a second position for securing the cup to the bottle bottom in response to movement of the cam follower from a low position to a high position, and
   (b) a support plate (49) for receiving a cup when the socket is in the first position, each socket enclosing and moving the support plate (49), on which a cup is placed, as the socket moves from the first to the second position, each support plate having downwardly extending feet (48) for positioning the support plate one of at and above a top portion (50) of the socket when the cam follower is in the low position, and the feet rest on an upper surface of the low turret plate when the cam follower is in the low position.

4. A machine according to claim 2, wherein the central channel (24) of each stopper is connected to a pneumatic circuit comprising two valves (39, 39') individually controlled by cam plates (37, 37'), one of said valves (39) controlling a distributor (65) for connecting the inside of a bottle (11) with a pressurized gas source and subsequently isolating the inside of the bottle from the gas source in response to a signal from a pressure switch (54) controlling the pressure of the gas inside the bottle, said pressure switch (54) sending a signal, if the bottle's seal is defective, to an automatic control device which activates a switching means (56) to reject the defective bottle, another one of said valves (39') controlling the venting of the inside of a bottle to atmosphere.

5. A machine according to claim 3, further comprising an ejector (51) installed upstream from means for placing cups (47) on the support plates (49) of the sockets (45) for removing any cups which have not adhered to a bottle bottom.

6. A machine for completing the manufacture of flexible, blow molded plastic bottles (11), said bottles having hemispherical shaped bottoms, said machine comprising:
   (a) first axially reciprocable means for individually seal testing said bottles by internally pressurizing them with gas at a sufficient pressure level to stiffen bodies of the bottles,
   (b) second axially reciprocating means for urging flat based cups (47) against the bottoms of the bottles, and
   (c) means for synchronously controlling the axial reciprocation of the first and second means such that the cups are secured to the bottle bottoms during the seal testing of the bottles whereat their bodies are sufficiently stiffened by internal pressurization to resist axial deformation.

* * * * *